United States Patent [19]

Kiguchi et al.

[11] Patent Number: 4,963,884

[45] Date of Patent: Oct. 16, 1990

[54] THERMAL PRINTER FOR PREHEATING A RECORDING SHEET

[75] Inventors: Masao Kiguchi; Takeshi Ono, both of Yokohama, Japan

[73] Assignee: Canon Kabushiki Kaisha, Tokyo, Japan

[21] Appl. No.: 210,249

[22] Filed: Jun. 23, 1988

[30] Foreign Application Priority Data

Jul. 3, 1987 [JP] Japan ................................ 62-165430

[51] Int. Cl.[5] ........................ G01D 9/00; G01D 15/10; B42J 3/20

[52] U.S. Cl. ................................ 346/1.1; 346/76 PH; 400/120

[58] Field of Search ............. 400/120; 346/1.1, 76 PH

[56] References Cited

U.S. PATENT DOCUMENTS 4,729,036 3/1988 Ikeda et al. ........................ 358/296

FOREIGN PATENT DOCUMENTS 0033564 3/1977 Japan .................................. 400/120
0013345 1/1979 Japan .................................. 400/120
566172 of 1981 Japan .
0027772 2/1982 Japan .................................. 400/120
0076275 5/1984 Japan .................................. 400/120
61-133756 6/1986 Japan .
0039261 2/1987 Japan .................................. 400/120

*Primary Examiner*—Bruce A. Reynolds
*Assistant Examiner*—Huan Tran
*Attorney, Agent, or Firm*—Fitzpatrick, Cella, Harper & Scinto

[57] ABSTRACT

A thermal printer for recording an image on a thermosensitive recording sheet has a thermal head for recording an image on the thermosensitive recording sheet, the thermal head having a plurality of heat generating elements, and a controller for controlling the heat generation of the thermal head standing by while being in contact with the thermosensitive recording sheet during non-recording, so as to generate heat at a low temperature whereat image recording is not effected on the thermosensitive recording sheet, so as to dry the thermosesnsitive recording sheet. The thermal head generates heat during recording in conformity with image information to effect image recording on the thermosensitive recording sheet.

22 Claims, 4 Drawing Sheets

THERMAL PRINTER FOR PREHEATING A RECORDING SHEET

BACKGROUND OF THE INVENTION

1. Field of the Invention

This invention relates to a thermal printer for recording an image on a recording sheet. Thermal printers include, for example, facsimile apparatuses, word processors or copying apparatuses. Recording sheets include, for example, thermosensitive recording sheets or plain paper recording sheets.

2. Related Background Art

A description will hereinafter be provided of a facsimile apparatus taken as an example of the thermal printer.

For example, in the ordinary facsimile apparatus, recording is accomplished by a heat reaction in thermosensitive recording paper. In such a construction, various alkali ions such as $Na^+$ are contained in the thermosensitive recording paper to prevent generation of static electricity. However, when such thermosensitive recording paper absorbs moisture the alkali ions in the thermosensitive recording paper dissolve into water, whereby an electrolyte solution is made. This electrolyte solution enters into the thermal head through pinholes in the protective film of the thermal head. Here, supposing a condition in which a power source is supplied to the recording unit of the thermal head and the recording (printing) cycle is not going on, there is brought about a state in which a voltage V is normally applied with the electrode of the thermal head as the positive pole and with the platen roller as the negative pole. Thus, an ion current flows from the electrode of the thermal head to the platen roller through the heat generating resistance members and further through the pin-holes in the protective film and the electrolyte solution in the thermosensitive recording paper. As a result, the electrode, etc. are electrolyzed, and if this current continues to flow for a long time, the electrode will be destroyed at last and recording will become impossible.

Heretofore, to prevent such phenomenon, control has been effected so that no voltage is applied to the recording unit of the thermal head, for example, during facsimile transmission (an example of the non-recording cycle). Specifically, a relay circuit or the like has been provided for control so that the supply of power to the recording unit of the thermal head is cut off or the voltage of the power source circuit itself is not generated. Therefore, it has been necessary to add a relay of great capacity to the load side of the power source unit or add an ON/OFF control circuit to the power source unit itself.

SUMMARY OF THE INVENTION

It is an object of the present invention to provide a compact thermal printer.

It is another object of the present invention to provide a thermal printer of low cost.

It is still another object of the present invention to provide a thermal printer which is improved in durability.

It is yet still another object of the present invention to provide a thermal printer in which the durability of the recording unit of a thermal head is improved by a simple construction, preferably, without providing any special means in the power source unit and the recording unit of the thermal head.

It is a further object of the present invention to provide a thermal printer which can obtain clearcut recorded images for a long period of time.

It is still a further object of the present invention to provide a thermal printer in which recording sheets can be dried during non-recording.

It is yet still a further object of the present invention to provide a thermal printer in which an ink sheet can be dried during non-recording.

The invention which achieves these objectives, according to one aspect, relates to a thermal printer for recording an image on a thermosensitive recording sheet. The printer has a thermal head for recording an image on the thermosensitive recording sheet, the thermal head having a plurality of heat generating elements. The printer also has control means for controlling the heat generation of the thermal head standing by while being in contact with the thermosensitve recording sheet during non-recording, so as to generate heat at a low temperature at which image recording is not effected on the thermosensitive recording sheet, so as to dry the thermosensitive recording sheet. The thermal head generates heat during recording in conformity with image information to effect image recording on the thermosensitive recording sheet.

According to another aspect, the present invention relates to a thermal printer for transferring the ink of an ink sheet to a recording sheet to thereby record an image on the recording sheet. The printer has a platen, a thermal head, and control means. The thermal head is provided in opposed relationship with the platen for transferring the ink of the ink sheet to the recording sheet to thereby record an image on the recording sheet. The thermal head has a plurality of heat generating elements. The control means controls the heat generation of the thermal head standing by with the ink sheet and the recording sheet interposed between the thermal head and the platen during non-recording, so as to generate heat at a low temperature at which the ink of the ink sheet is not transferred to the recording sheet so as to dry the recording sheet through the ink sheet. The thermal head generates heat during recording in conformity with image information to transfer the ink of the ink sheet to the recording sheet an effect image recording on the recording sheet.

According to another aspect, the present invention which achieves these objectives relates to the thermal recording method for recording on a thermosensitive paper. The method comprises the steps of recording on the thermosensitive paper by causing a plurality of heat generating elements provided on a thermal head to generate heat in response to image information during recording, and causing the heat generating elements to generate heat at a temperature lower than the temperature during the recording when the thermal head is in a stand-by position in contact with the thermosensitive paper during non-recording.

According to still another aspect, the invention which achieves these objectives relates to a thermal recording method for recording on a recording sheet. The method comprises the steps of recording on the recording sheet by causing a plurality of heat generating elements provided on a thermal head to generate heat in response to image information and transferring ink contained in an ink sheet to the recording sheet during recording. The method further comprises the step of causing the heat generating elements to generate heat at a temperature lower than the temperature during recording when the thermal head is in a stand-by position pressed in contact with a platen during non-recording, and when the recording sheet and the ink sheet are disposed between the thermal head and the platen.

DETAILED DESCRIPTION OF THE PREFERRED EMBODIMENT

An embodiment which will hereinafter be described has its gist residing in that it is provided with pre-heating and controlling means for pre-heating and controlling the recording unit of a thermal head with a predetermined electric power during the time other than the recording cycle by the recording unit of the thermal head.

Also preferably, in one mode, the pre-heating and controlling means pre-heats and controls the recording unit of the thermal head by applying a signal of predetermined pulse width less than the heat transfer pulse width to the recording element of the recording unit of the thermal head.

Also preferably, the embodiment is provided with temperature detecting means for detecting the temperature of the recording unit of the thermal head, and in one mode, the pre-heating and controlling means preheats and controls the recording unit of the thermal head when the temperature of the recording unit of the thermal head detected by the temperature detecting means is below a predetermined temperature.

Thus, thermosensitive recording paper or plain paper which is in contact with the recording unit of the thermal head (in the case of plain paper, the contact being made with an ink ribbon or the like interposed therebetween) can be dried even in a high humidity condition, and the heat generating member or the like of the thermal head is obviated from being corroded by a chemical reaction caused through moisture contained in the recording paper.

An embodiment to which the present invention is applied will hereinafter be described in detail with reference to the accompanying drawings.

Figure 3A:
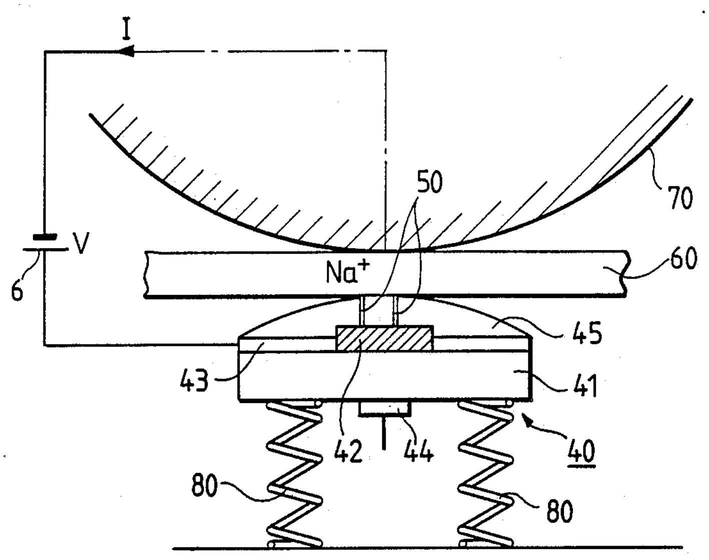
FIG. 3A is a cross-sectional view of an example of the recording unit of a thermal head applied to a thermal recording apparatus according to an embodiment of the present invention for effecting image recording on a thermosensitive recording sheet.

FIG. 3A is a cross-sectional view of an example of the recording unit of a thermal head applied to a thermal recording apparatus according to an embodiment of the present invention. In FIG. 3A, the reference numeral 40 designates a thermal head having a ceramic base plate, heat generating resistance members, an electrode and a protecting film which will all be described hereinafter. The reference numeral 41 denotes a ceramic base plate for holding the heat generating resistance members 42 of the thermal head 40 which will be described later, the reference numeral 42 designates a plurality of heat generating resistance members arranged in the form of an array in a direction perpendicular to the plane of the drawing sheet, the reference numeral 43 denotes an electrode for supplying electric power to the heat generating resistance members 42, the reference numeral 45 designates a wear-proof, highly insulative, highly heat conductive thermal head protecting film (a kind of glass), the reference numeral 50 denotes pin-holes created in the protecting film 45 during the manufacturing process, the reference numeral 60 designates thermosensitive recording paper containing various alkali ions such as $Na^+$, the reference numeral 70 denotes a platen roller, and the reference numeral 6 designates a power source for driving the thermal head.

The reference numeral 80 denotes springs for pressing the base plate 41 toward the platen roller 70 to thereby bring the thermal head 40 into contact with the thermosensitive recording paper 60. Thus, in the present embodiment, in the ON state of at least the main power source (not shown) of the apparatus, the thermal head 40 is always in contact with the thermosensitive recording paper 60 (inclusive of the record standby condition during non-recording). Accordingly, recording can be quickly started during recording. During the insertion of the recording paper or during the maintenance of the apparatus, the thermal head 40 can be spaced apart from the platen roller 70 by operating a head releasing lever (not shown) or opening the apparatus body.

Figure 3B:
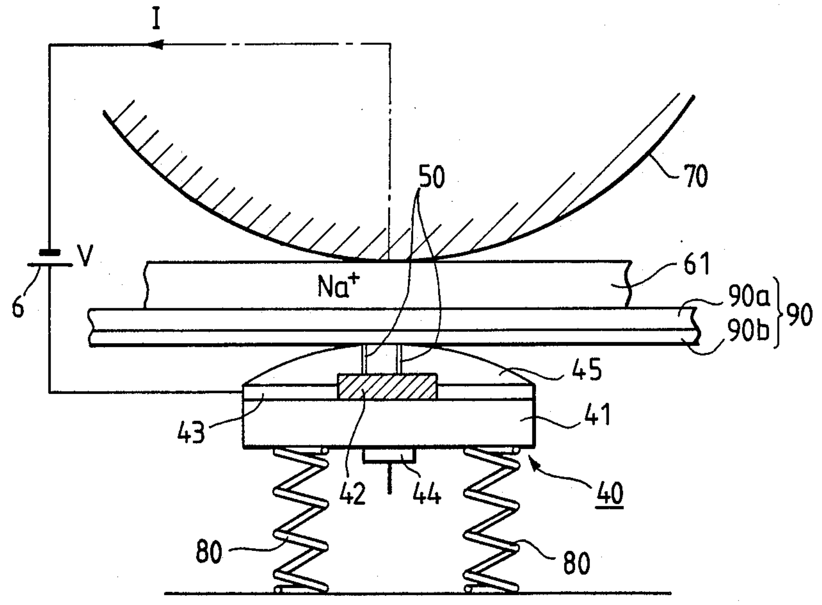
FIG. 3B is a cross-sectional view of an example of the recording unit of a thermal head applied to a thermal recording apparatus according to an embodiment of the present invention for transferring ink from an ink sheet to plain paper and effecting image recording on the plain paper.

FIG. 3B is a cross-sectional view of an example of the recording unit of the thermal head in which the previously described embodiment is applied to a so-called heat transfer recording apparatus. In FIG. 3B, members similar to those in FIG. 3A are given similar reference numerals and need not be described.

The present embodiment is such that by the heat generation of the thermal head 40, the ink of an ink sheet 90 having an ink layer 90*a* in a substrate 90*b* is transferred from the ink sheet 90 to a plain paper recording sheet 61. Thereby, image recording is accomplished on the plain paper recording sheet 61. So, in the present embodiment, the thermal head 40 is urged against the platen roller 70 by the resilient forces of the springs 80 with the plain paper recording sheet 61 and the ink sheet 90 interposed therebetween. Accordingly, during the pre-heating of the thermal head 40, the thermal head 40 heats and dries the plain paper recording sheet 61 and the ink sheet 90 by the heat thereof.

Figure 1:
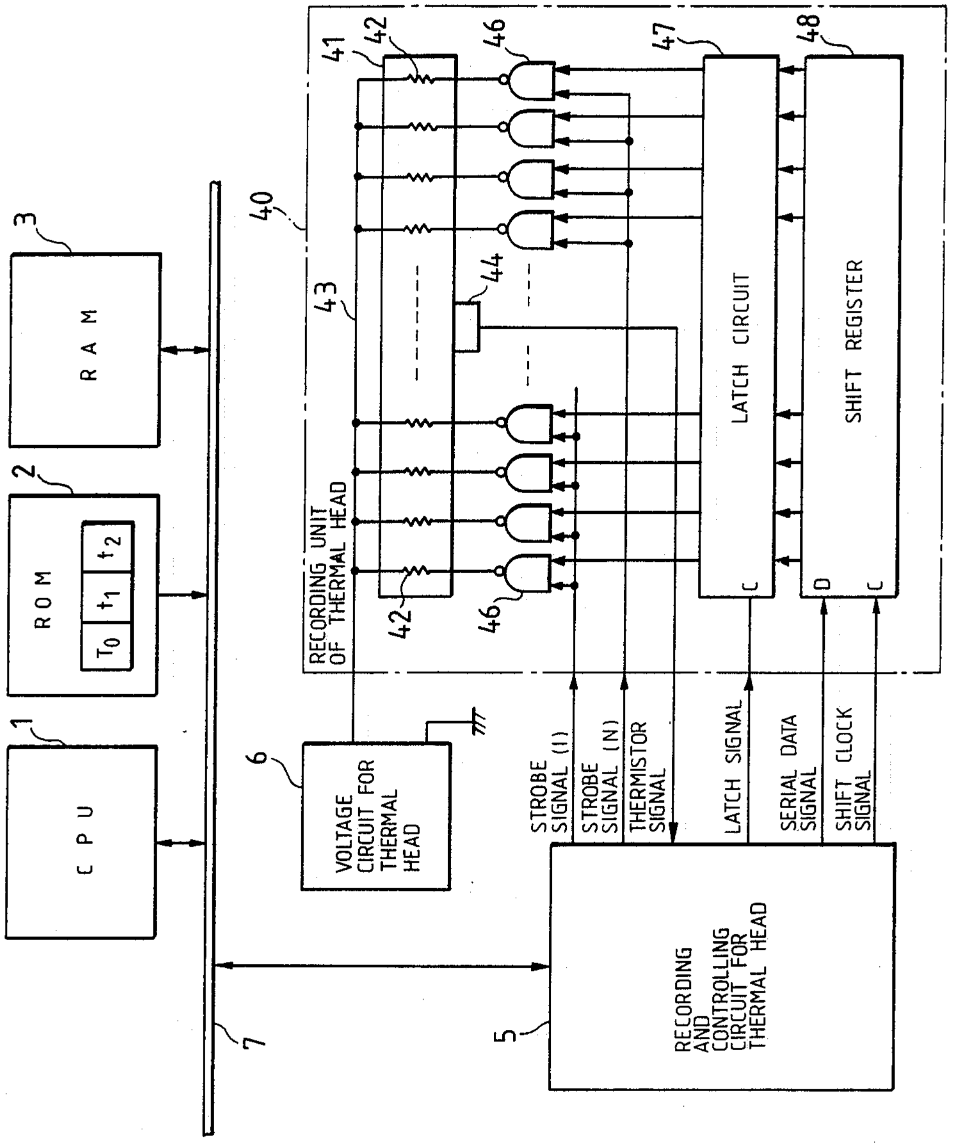
FIG. 1 is a block diagram of an embodiment of a thermal recording apparatus to which the present invention is applied.

FIG. 1 is a block diagram of the thermal recording apparatus according to an embodiment of the present invention. In FIG. 1, members similar in construction to those in FIG. 3 are given similar reference numerals and need not be described. In FIG. 1, the reference numeral 1 designates a central processing unit (CPU) which governs the main control of the thermal recording apparatus, and the reference numeral 2 denotes a read-only memory (ROM) storing therein a control program (for example, the pre-heating process of FIG. 2) executed by the CPU 1. The ROM 2 stores therein a temperature parameter $T_0$ of a predetermined temperature for controlling the temperature of the thermal head 40, a print parameter $t_1$ determining the print pulse width of the thermal head 40, and a pre-heating parameter $t_2$ determining the pre-heating pulse width of the thermal head 40. Further, the reference numeral 3 designates a random access memory (RAM) which the CPU 1 uses as a work area, the reference numeral 40 denotes the recording unit of the thermal head of the type which contains a driver IC, the reference numeral 5 designates a recording and controlling circuit for the thermal head which controls the recording unit 40 of the thermal head under the control of the CPU 1, the reference numeral 6 denotes a voltage circuit for the thermal head which supplies a heat generation driving power to the heat generating resistance members 42 of the recording unit 40 of the thermal head, and the reference numeral 7 designates a common bus of the CPU 1.

Also, in the recording unit 40 of the thermal head, the reference numeral 44 denotes a thermistor for detecting the temperature of the thermal head which is provided on the rear surface of the ceramic base plate 41, the reference numeral 46 designates a driver circuit for the heat generating resistance members 42, the reference numeral 47 denotes a latch circuit for record data, and the reference numeral 48 designates a shift register for converting serial record data supplied from the recording and controlling circuit 5 for the thermal head into parallel record data.

Figure 2:
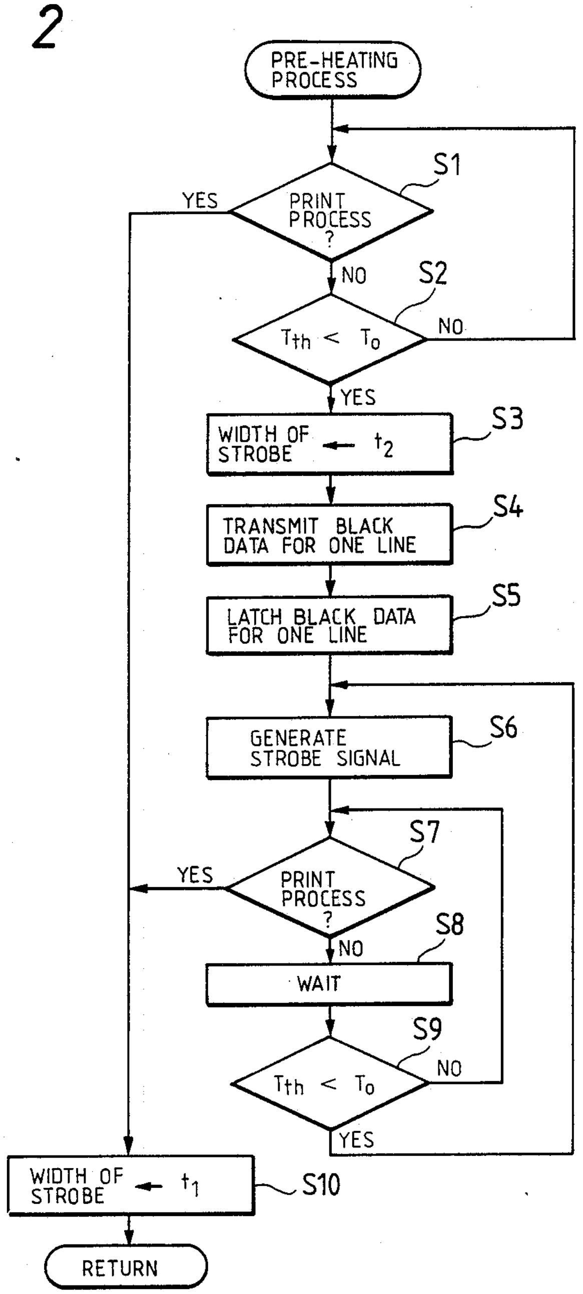
FIG. 2 is a flow chart showing the pre-heating process procedure performed by CPU 1.

FIG. 2 is a flow chart showing the pre-heating process procedure by the CPU 1. In FIG. 2, at step Sl whether the system is in the print (recording) process is examined. If the system is not in the print process, advance is made to step S2, where whether the temperature Tth of the thermal head 40 detected by the thermistor 44 is lower than the temperature parameter $T_0$ of a predetermined temperature (a temperature slightly lower than the image recording temperature) is examined. If the temperature Tth is not lower than the temperature parameter $T_0$, pre-heating is not necessary and therefore, return is made to step S1. However, if the temperature Tth of the thermal head 40 is lower than the temperature parameter $T_0$ of the predetermined temperature, advance is made to step S3, where a pre-heating parameter $t_2$ determining the pre-heating pulse width is set in the print strobe width determining circuit (not shown) of the recording and controlling circuit 5 for the thermal head. The pre-heating parameter $t_2$ is smaller than the print parameter $t_1$ determining the print pulse width and is of such a degree that the thermosensitive recording paper 60 does not form any color (or is of such a degree that ink is not transferred from the ink sheet 90 to the plain paper recording sheet). At step S4, print (record) data for one line are all set to black dots and transmitted to the shift register 48. At step S5, all the black data of the shift register 48 are latched in the latch circuit 47. At step S6, strobe signals (1) - (N) of pre-heating pulse width $t_2$ are successively turned on to thereby pre-heat the heat generating resistance members 42 once. Thus, pre-heating is accomplished without the thermosensitive recording paper 60 forming any color (or without ink being transferred from the ink sheet 90 to the plain paper recording sheet). At step S7, whether the system requires the print process is examined by a flag or the like, not shown. If the system does not require the print process, advance is made to step S8, where the system waits for a predetermined time. The purpose of this waiting for a predetermined time is to cause the heat generating resistance members 42 to intermittently generate heat and thereby prevent a sharp rise of the temperature of the thermal head 40 and rather maintain the temperature of the thermal head sufficient to dry the portion of contact of the thermosensitive recording paper 60 (or the ink sheet 90) with the thermal head 40 (In case of thermal transfer recording as shown in FIG. 3B, ink sheet 90 and plain paper recording sheet 61 are dried). At step S9, whether the temperature Tth of the thermal head 40 detected by the thermistor 44 is lower than the temperature parameter $T_0$ of the predetermined temperature is examined. If the temperature Tth is not lower than the temperature parameter $T_0$, it is not necessary to pre-heat the thermal head immediately and therefore, return is made to step S7. If the temperature Tth is lower than the temperature parameter $T_0$, pre-heating is not sufficient and therefore, a return is made to step S6, where strobe signals (1) - (N) of pre-heating pulse width $t_2$ are successively turned on again to cause the heat generating resistance members 42 to generate heat once. In that case, all the black record data are held in the latch circuit 47.

Also, when it is judged at step S1 or S7 that the system is in the print process or requires the print process, advance is made to step S10, where the print parameter $t_1$ determining the print pulse width is set in the print strobe width determining circuit of the recording and controlling circuit 5 for the thermal head. The print parameter $t_1$ is greater than the pre-heating parameter $t_2$ determining the pre-heating pulse width and is sufficient for the thermosensitive recording paper 60 to form a color (or for the ink to be transferred from the ink sheet 90 to the plain paper recording sheet 61).

Figure 4:
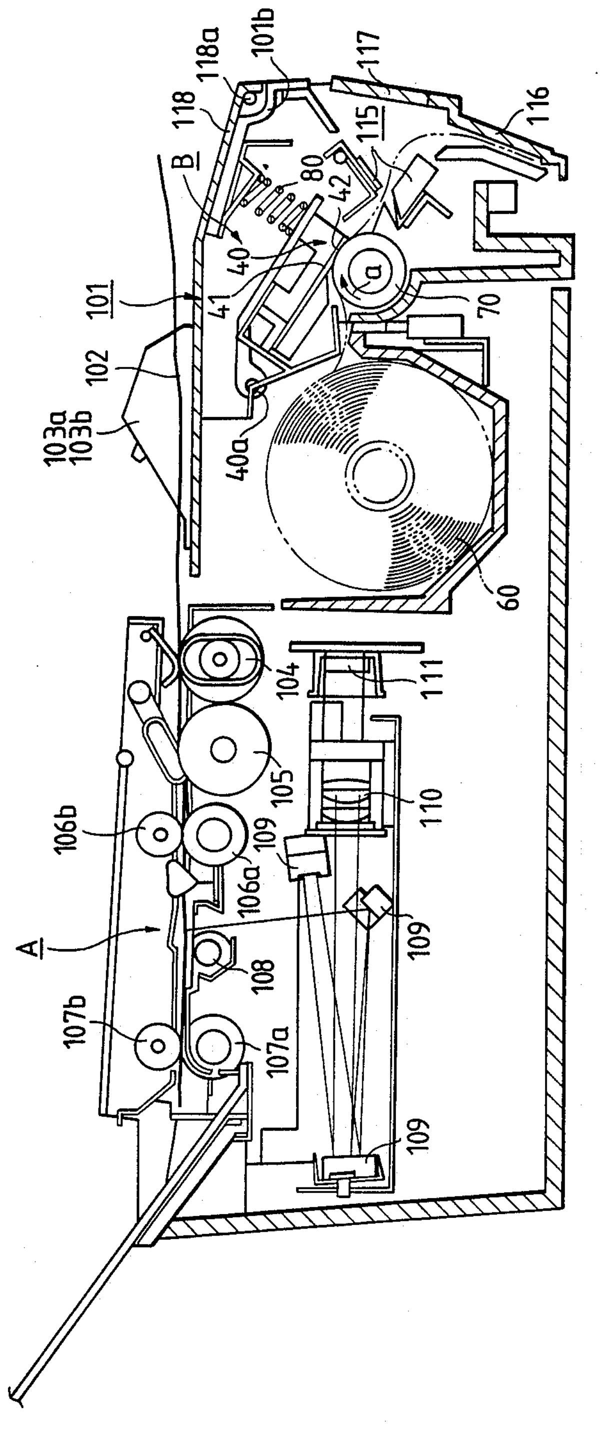
FIG. 4 is a side view of a facsimile apparatus to which the embodiment shown in FIG. 3A is applied.

Reference is now made to FIG. 4 to describe a facsimile apparatus to which the aforedescribed embodiment is applied.

In FIG. 4, the letter A designates an original conveying and reading system. A plurality of originals 102 piled on an original supporting table 101 serving also as an apparatus cover, with the surfaces thereof to be read facing downward, have their opposite ends guided by sheet guide members 103*a* and 103*b*, and some of the piled originals 102 are conveyed by a preliminary conveyor roller 104, and are separated one by one by a separating roller 105. Further, each separated original 102 is illuminated by a light source 108 while being conveyed at a constant speed by a pair of conveyor rollers 106*a* and 106*b* and a pair of discharge rollers 107*a* and 107*b*. The reflected light from the original arrives at a photoelectric conversion element 111 such as a CCD via a plurality of mirrors 109 and a lens 110 and is converted into an electrical signal. This signal may be transmitted to the recording system of another facsimile apparatus in the case of the facsimile function, and to the recording system of the present apparatus in the case of the copying function.

The recording system B is designed such that when a recording signal is input thereto, a platen roller 70 is rotated in the direction of arrow a and the thermal head 40 adapted to generate heat in response to an image signal is driven to generate heat. Thereby, a predetermined image is recorded on a recording sheet 60 comprising a roll of thermosensitive paper. After the recording, the recording sheet 60 is cut from the rear end of the image by a cutter 115, and may be discharged onto a tray 116. The reference numeral 117 designates an opening through which the recording sheet 60 after the recording may be taken out, and the reference character 40*a* denotes the pivot shaft of the recording unit 40 of the thermal head.

In the above-described embodiment, all the black record data are latched in the latch circuit 47 to thereby pre-heat the recording unit 40 of the thermal head intermittently, whereas this is not restrictive. Alternatively, for example, record data of a certain pattern which is not black record data may be circulated at a certain period, whereby all the heat generating resistance members 42 may be pre-heated as a result.

Also, if the pre-heating electric power is made smaller, pre-heating control may be effected not intermittently, but continuously.

Further, an indirect pre-heating method may be adopted instead of the method of pre-heating by applying an electric power directly to all the heat generating resistance members 42 as described above. That is, a method of pre-heating by other heat generating means than the heat generating resistance members 42 for recording may be adopted, such as a method of providing a pre-heating heater on the thermal head and keeping the thermal heat at a predetermined temperature by the heater.

Although very rough control, the temperature of the recording unit of the thermal head need not be detected by the thermistor 44 or the like, but for example, it is possible to effect pre-heating control one sidedly (without feedback of temperature detection) by statistically determined pre-heating electric power, and this also produces a sufficient drying effect.

As described above, according to the present embodiment, the recording unit of the thermal head is pre-heated and controlled by predetermined electric power during the time other than the recording cycle by the reocrding unit of the thermal head, whereby the portion of contact of the thermosensitive recording paper (or the ink sheet and the plain paper recording sheet) and further the thermal head itself can be kept in a dried condition at all times and thus, the life of the thermal head becomes appreciably longer.

Also, preferably, the recording unit of the thermal head is directly pre-heated and controlled by a signal of predetermined pulse width less than the pulse width required for image recording being applied to the recording element of the recording unit of the thermal head and therefore, the existing construction of the recording unit of the thermal head can be intactly utilized, and this contributes greatly to the compactness and reduced cost of the apparatus.

As described above in detail, according to the present invention, there can be provided a thermal printer which can be improved in durability by a simple construction.

We claim:

1. A thermal printer for recording an image on a thermosensitive recording sheet, having:

a thermal head for recording an image on the thermoselsitive recording sheet, said thermal head having a plurality of heat generating elements; and control means for controlling the heat generation of said thermal head standing by while said thermal head is in contact with the thermosensitive recording sheet during non-recording, so as to generate heat at a low temperature at which image recording is not effected on the thermosensitive recording sheet, so as to dry the thermosensitive recording sheet;

said thermal head generating heat during recording in conformity with image information to effect image recording on the thermosensitive recording sheet.

2. A thermal printer according to claim 1, wherein said control means pre-heats and controls said thermal head by applying to said thermal head a pulse width shorter than a pulse width applied to effect image recording.

3. A thermal printer according to claim 1, further having temperature detecting means for detecting the temperature of said thermal head and wherein said control means pre-heats and controls said thermal head when the temperature of said thermal head detected by said temperature detecting means is below a predetermined temperature.

4. A thermal printer according to claim 1, wherein said control means always pre-heats and controls said thermal head in a temperature range in which image recording is not effected.

5. The thermal printer of claim 1, wherein said thermal head presses said platen by the resiliency of a spring through the thermosensitive recording sheet.

6. The thermal printer of claim 1, wherein said control means causes said thermal head to generate heat by setting all data at black dots when the thermal head generates heat during non-recording.

7. The thermal printer of claim 1, wherein said control means causes said thermal head to generate heat when the temperature of the thermal head which is measured at a predetermined time interval during non-recording is lower than a predetermined temperature.

8. A thermal printer for transferring the ink of an ink sheet to a recording sheet to thereby record an image on the recording sheet, having:

a platen;

a thermal head provided in opposed relationship with said platen for transferring the ink of the ink sheet to the recording sheet to thereby record an image on the recording sheet, said thermal head having a plurality of heat generating elements; and control means for controlling the heat generation of said thermal head standing by with said thermal head pressed to said platen through said ink sheet and said recording sheet during non-recording, so as to generate heat at a low temperature at which the ink of the ink sheet is not transferred to the recording sheet, so as to dry the recording sheet through the ink sheet;

said thermal head generating heat during recording in conformity with image information to transfer the ink of the ink sheet to the recording sheet and effect image recording on the recording sheet.

9. A thermal printer according to claim 8, wherein said control means pre-heats and controls said thermal head by applying to said thermal head a pulse width shorter than a pulse width applied to effect image recording.

10. A thermal printer according to claim 8, further having temperature detecting means for detecting the temperature of said thermal head and wherein said control means pre-heats and controls said thermal head when the temperature of said thermal head detected by said temperature detecting means is below a predetermined temperature.

11. A thermal printer according to claim 8, wherein said control means always pre-heats and controls said thermal head in a temperature range in which image recording is not effected.

12. The thermal printer of claim 8, wherein said thermal head presses said platen by the resiliency of a spring.

13. The thermal printer of claim 8, wherein said control means causes said thermal head to generate heat by setting all data at black dots when the thermal head generates heat during non-recording.

14. The thermal printer of claim 8, wherein said control means causes said thermal head to generate heat when the temperature of the thermal head which is measured at a predetermined time interval during non-recording is lower than a predetermined temperature.

15. A thermal recording method for recording on a thermosensitive paper, said method comprising the steps of:

recording on the thermosensitive paper by causing a plurality of heat generating elements provided on a thermal head to generate heat in response to image information during recording; and causing said heat generating elements to generate heat at a temperature lower than the temperature during recording when said thermal head is in a stand-by stat at which said thermal head is pressed to said thermosensitive recording sheet during non-recording.

16. A method according to claim 15, wherein during non-recording said heat generating elements are supplied with a pulse having a pulse width shorter than that applied during said recording.

17. A method according to claim 15, wherein during non-recording, when the temperature of said thermal head which is detected by a temperature detecting means is less than a predetermined temperature, said heat generating elements generate heat and when the temperature of said thermal head which is detected by the temperature detecting means is at least as great as said predetermined temperature, said heat generating elements are prohibited from generating heat.

18. The method of claim 15, wherein said thermal head presses said platen by the resiliency of a spring through the thermosensitive recording sheet.

19. A thermal recording method for recording on a recording sheet, said method comprising the steps of:

recording on the recording sheet by causing a plurality of that generating elements provided on a thermal head to generate heat in response to image information and transferring ink contained in an ink sheet to said recording sheet during recording; and causing said heat generating elements to generate heat at a temperature lower than the temperature during recording when said thermal head is in a stand-by state at which said thermal head is pressed to a platen through said ink sheet and said recording sheet during non-recording, and when said recording sheet and said ink sheet are disposed between said thermal head and said platen.

20. A method according to claim 19, wherein during said non-recording said heat generating elements are supplied with a pulse width shorter than that applied during said recording.

21. A method according to claim 19, wherein during said non-recording, when the temperature of said thermal head which is detected by a temperature detecting means is less than a predetermined temperature, said heat generating elements generate heat and when the temperature of said thermal head which is detected by the temperature detecting means is at least as great as said predetermined temperature, said heat generating elements are prohibited from generating heat.

22. The method of claim 19, wherein said thermal head presses said platen by the resiliency of a spring.

* * * * *

UNITED STATES PATENT AND TRADEMARK OFFICE
CERTIFICATE OF CORRECTION

PATENT NO. : 4,963,884 Page 1 of 2
DATED : October 16, 1990
INVENTOR(S) : MASAO KIGUCHI, ET AL.

It is certified that error appears in the above-identified patent and that said Letters Patent is hereby corrected as shown below:

On the title page:

[56] FOREIGN PATENT DOCUMENTS

"0033564 3/1977 Japan" should read
--0033544 3/1977 Japan--.
"566172 of 1981 Japan" should read
----56 - 62172 5/1981 Japan--.

[57] ABSTRACT

"mosesnsitive" should read --mosensitive--.

COLUMN 2

Line 46, "an" should read --to--.

COLUMN 7

Lines 56, "moselsitive" should read --mosensitive--.

UNITED STATES PATENT AND TRADEMARK OFFICE
CERTIFICATE OF CORRECTION

PATENT NO. : 4,963,884
DATED : October 16, 1990
INVENTOR(S) : MASAO KIGUCHI, ET AL.

It is certified that error appears in the above-identified patent and that said Letters Patent is hereby corrected as shown below:

COLUMN 9

Line 21, "stat" should read --state--.

COLUMN 10

Line 9, "that generating elements" should read --heat generating elements--.

Signed and Sealed this

Twelfth Day of May, 1992

*Attest:*

DOUGLAS B. COMER

*Attesting Officer*

*Acting Commissioner of Patents and Trademarks*